2,793,101
PROCESS FOR REFINING OF CARBON BLACKS

Adolf Weihe, Kronberg (Taunus), Germany, assignor to Deutsche Gold- und Silber-Scheideanstalt vormals Roessler, Frankfurt am Main, Germany, a corporation of Germany No Drawing. Application October 22, 1953,
Serial No. 387,797

Claims priority, application Germany December 9, 1952

1 Claim. (Cl. 23—209.9)

The present invention comprises a new and improved process for producing carbon blacks having high coloring properties. The varnish and printing-ink industries impose special requirements in this respect on the carbon blacks they employ, differing substantially from those of the rubber industry. These requirements are primarily:

1. High coloring power and intensity.
2. Low oil consumption, or, what amounts to much the same thing, low viscosity of suspensions, e. g. in vegetable oils.
3. Absence of thixotropy on the part of such suspensions, as there is otherwise a more or less pronounced thickening of varnishes, inks, etc. in storage.
4. Adequate wettability.

Detailed investigation has shown that all carbon blacks produced from liquid hydrocarbons, particularly the higher-boiling-point fractions of petroleum and coal tar, such as crude naphthalene, anthracene oil, carbazolic anthracene-oil residues and the like, generally termed furnace blacks, can be brought to very high coloring power and intensity by suitable control of the combustion process. However, blacks so produced have certain properties prejudicial to their use in the varnish and printing-ink field, namely their suspensions in the conventional vehicle for varnishes and printing inks are found to be highly viscous, to have more or less tendency to thicken, and to have poor wetting properties.

The varnish and ink industries therefore reject such carbon blacks as a rule. In the manufacture of typewriter ribbons and carbon papers and for coloring spinning solutions in rayon manufacture, to mention some further examples, these properties are likewise extremely undesirable.

A remarkable and especially adverse circumstance is that precisely the most intense blacks prepared from the raw materials specified above yield suspensions of the highest viscosity and at the same time have the most marked tendency to thicken upon storage. Broadly speaking, intensity of color and viscosity are correlated, and the tendency to thickening, or thixotropy, increases with increasing viscosity.

It has now unexpectedly been discovered that the viscosity of suspensions of blacks can be reduced and their thixotropy diminished or entirely eliminated if the carbon black, mixed with liquids, is subjected to treatment for several hours at elevated temperatures, in particular over 100° C. Very good results have been obtained by heating carbon black with water under pressure. If a high-grade intense black, for example a coloring black obtained from anthracene oil and known by the name "Regent," is tested for the viscosity of its suspension in linseed oil (1:10), a paste of about 10,000 centipoises is obtained. If this black is heated with water under pressure at 140°, then a linseed-oil suspension of about 2500 centipoises is obtained after heating for three hours and thorough drying, and one of about 1000 centipoises after heating for five hours.

Suspensions of carbon blacks so treated are found to be entirely free of thixotropy; some intensification of color is definitely observable by comparison of coats of varnish on glass. As would be expected, the wettability of these blacks is excellent as compared to the untreated material.

The mode of treatment may be varied both with respect to duration of treatment and with respect to temperature and amount of liquid. Chemicals, for example ammonia, may be added to the water, as for the purpose of saturating any carboxyl groups present in the carbon black; and finally, organic liquids may be used instead of water, reduced viscosities being obtained even without application of pressure, with the advantage that the carbon black need not be dried for certain purposes.

The special advantage of this mode of treatment with liquids at elevated temperatures is that coloring blacks of extreme intensity can be so reduced in viscosity as to afford unprecedentedly low oil consumption and an excellent wettability hitherto observable only in blacks of substantially lower intensity. In the carbon processing industry, this represents a significant advance in the art.

With regard to the industrial practice of the proposed mode of treatment for carbon blacks, there are a variety of possibilities, the numerical proportion of carbon black to liquid being likewise variable within wide limits. A 10% aqueous dispersion of carbon black may be heated in an agitator autoclave, or continuously treated while flowing through a tube. In higher-boiling-point liquids, the carbon black may be heated without the aid of pressure. It is also possible to heat very highly concentrated suspensions of carbon black in a heated colloid pump, for example a conventional Leistritz Pump. None of these practical variants falls outside the scope of the invention.

Examples

1. In a stainless steel agitator autoclave of 1.5 cu. m. capacity, 100 kg. of an intense black from anthracene-oil residues is intimately mixed with 1000 liters of water. A small amount of wetting agent may be added. The autoclave is closed and heated to 138–140° C. with constant agitation. It is kept at this temperature for five hours, then cooled and the contents of the autoclave forced with continued agitation into a screenless centrifuge with automatic discharge. If high-capacity centrifuges like those commonly used in the starch industry are employed, the carbon black leaves the discharge screw in finely granular form with about 60% moisture. It is then dried to 98–99% dry content in a drying drum. After this treatment, the carbon black, originally not readily wettable, is readily wetted and dispersed by organic liquids as well as by water.

The viscosity of a carbon black in 1:10 linseed-oil suspension was 9800 cps. before treatment and 975 cps. after treatment.

The usual high thixotropy of a suspension of the untreated carbon black was entirely eliminated by that treatment.

2. In a colloid mill of 100 kg. effective capacity with provision for heating, 200 kg. carbon black (from a mixture of anthracene oil and naphthalene sludge) is worked up to a homogeneous paste with 400 kg. octanol (2-ethyl-hexanol-1).

The mass is heated to 150° C. and ground for two hours at that temperature. The carbon paste (approximately 33%) obtained can be added to conventional synthetic-resin varnishes, in particular, firing enamels, thus eliminating prolonged grinding in ball mills and other heavy-duty grinding equipment as ordinarily required. Enough of this carbon paste is added to make four parts of carbon black to 100 parts of vehicle.

Thickening of black varnishes so prepared will not occur even upon prolonged storage. The carbon is extremely finely divided. These varnishes therefore yield brilliant, intense black coatings after heat treatment.

3. In a steam-heated agitator vessel with reflux condenser, of 1000 liters effective capacity, 150 kg. of an intense black prepared from anthracene oil is placed in 850 kg. dibutyl phthalate, with constant agitation. The mixture is heated to 145° within one hour and kept at that temperature for one and one-half hours.

It is then cooled to 60–80° C. and the black paste packed in shipping containers.

The paste may be used to special advantage for coloring nitro varnishes and nitro-compound varnishes.

Having thus disclosed my invention and described in detail illustrative examples of this application, I claim as new and desire to secure by Letters Patent:

The process of reducing the viscosity of suspensions of color blacks and diminishing their thixotropy, which comprises the steps of subjecting a slurry of furnace carbon black to a temperature above 100° C. under superatmospheric pressure in a closed space for at least an hour, the slurry containing ammonia reacting to saturate any carboxyl group present in the carbon black, then cooling the slurry to 60–80° C. and packing it as a black paste.

References Cited in the file of this patent
UNITED STATES PATENTS

| | | |
|---|---|---|
| 581,391 | Cabot | Apr. 27, 1897 |
| 1,207,694 | Pike | Dec. 5, 1916 |
| 2,210,763 | King | Aug. 6, 1940 |
| 2,668,873 | Lichtenfels | Feb. 9, 1954 |
| 2,676,873 | Cines et al. | Apr. 27, 1954 |